United States Patent
Lin et al.

(10) Patent No.: US 12,304,826 B2
(45) Date of Patent: May 20, 2025

(54) METHOD FOR PRODUCING LITHIUM IRON PHOSPHATE PRECURSOR BY USING RETIRED LITHIUM IRON PHOSPHATE BATTERY AS RAW MATERIAL

(71) Applicant: CONTEMPORARY AMPEREX TECHNOLOGY (HONG KONG) LIMITED, Hong Kong (CN)

(72) Inventors: Yongshou Lin, Ningde (CN); Guobao Wang, Ningde (CN); Ke Wang, Ningde (CN); Jiang Liu, Ningde (CN); Bin Yao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 652 days.

(21) Appl. No.: 17/655,092

(22) Filed: Mar. 16, 2022

(65) Prior Publication Data
US 2022/0204355 A1    Jun. 30, 2022

Related U.S. Application Data

(63) Continuation of application No. PCT/CN2019/121728, filed on Nov. 28, 2019.

(51) Int. Cl.
| | |
|---|---|
| *C01D 15/08* | (2006.01) |
| *C01B 25/37* | (2006.01) |
| *C25C 1/12* | (2006.01) |
| *H01M 4/58* | (2010.01) |
| *H01M 10/0525* | (2010.01) |
| *H01M 10/54* | (2006.01) |

(52) U.S. Cl.
CPC ............ *C01D 15/08* (2013.01); *C01B 25/375* (2013.01); *C25C 1/12* (2013.01); *H01M 4/5825* (2013.01); *H01M 10/0525* (2013.01); *H01M 10/54* (2013.01); *C01P 2006/80* (2013.01)

(58) Field of Classification Search
CPC ......... C01D 15/08; C01B 25/375; C25C 1/12; H01M 10/0525; H01M 10/54; H01M 4/5825
See application file for complete search history.

(56) References Cited

U.S. PATENT DOCUMENTS

| | | |
|---|---|---|
| 6,514,311 B1 | 2/2003 | Lin et al. |
| 2018/0261894 A1 | 9/2018 | Wang et al. |

FOREIGN PATENT DOCUMENTS

| | | |
|---|---|---|
| CN | 1172404 C | 10/2004 |
| CN | 101847763 A | 9/2010 |
| CN | 106207301 A | 12/2016 |
| CN | 106450547 A | 2/2017 |
| CN | 107352524 A | 11/2017 |
| CN | 107777711 A | 3/2018 |
| CN | 108075202 A | 5/2018 |
| CN | 107381604 B | 4/2019 |
| CN | 109721043 A | 5/2019 |
| CN | 109818100 A | 5/2019 |
| IN | 106684489 A | 5/2017 |
| WO | 2018/209164 A1 | 11/2018 |

OTHER PUBLICATIONS

Yang et al., Green Chemistry, (2018), v.20, p. 3121-3133.*
Aktas et al., Mineral Processing and Extractive Metallurgy, (2006), 115(2), p. 95-100.*
Written Opinion received in the corresponding International Application PCT/CN2019/121728, mailed Aug. 19, 2020.
The extended European search report received in the corresponding European Application 19954623.5, mailed Apr. 7, 2022.
Decision to Grant a Patent received in the corresponding European Application 19954623.5, mailed Sep. 30, 2022.
Contemporary Amperex Technology Co., Limited, International Search Report with English Translation, PCT/CN2019/121728, Aug. 19, 2020, 7 pgs.
Contemporary Amperex Technology Co., Limited, CN First Office Action with English Translation, CN 201980063341.4, Nov. 30, 2021, 12 pgs.

* cited by examiner

*Primary Examiner* — Yong L Chu
(74) *Attorney, Agent, or Firm* — K&L Gates LLP

(57) ABSTRACT

A method for producing a lithium iron phosphate precursor by using a retired lithium iron phosphate battery as a raw material is provided, which includes steps of: soaking a battery cell in acid, performing electrolysis to reclaim copper, oxidizing ferrous iron, precipitating iron phosphate, and precipitating lithium carbonate. After precipitation is completed, performing one-step reclaim to obtain the lithium iron phosphate precursor.

20 Claims, No Drawings

METHOD FOR PRODUCING LITHIUM IRON PHOSPHATE PRECURSOR BY USING RETIRED LITHIUM IRON PHOSPHATE BATTERY AS RAW MATERIAL

CROSS REFERENCE TO RELATED APPLICATION

The present application is a continuation of international application No. PCT/CN2019/121728, filed on Nov. 28, 2019, which is hereby incorporated by reference in its entirety.

TECHNICAL FIELD

This application relates to the field of batteries, and in particular, to a method for producing a lithium iron phosphate precursor by using a retired lithium iron phosphate battery as a raw material.

BACKGROUND

In recent years, the new energy vehicle industry has been facing a situation of rapid development. With the explosive growth of the new energy vehicle industry, the usage of traction batteries, which are the "heart" of new energy vehicles, also keeps increasing. In addition, more and more traction batteries are going to retire. If retired batteries are not properly handled, they will not only cause significant pollution to the environment, but also lead to a waste of resources.

At present, researchers around the world have conducted some researches on reclamation of lithium iron phosphate batteries and renewal of lithium iron phosphate materials. However, existing methods still have various defects. For example, many processes are required for separating aluminum foils, reclaimed lithium iron phosphate materials have high impurity content, reclamation costs are high, and significant pollution is brought to the environment.

SUMMARY

In view of the problems in the Background, some embodiments of this application provide a method for producing a lithium iron phosphate precursor by using a retired lithium iron phosphate battery as a raw material, to obtain a lithium iron phosphate precursor material with low impurity content at relatively low reclamation cost.

The method for producing a lithium iron phosphate precursor by using a retired lithium iron phosphate battery as a raw material provided in some embodiments of this application includes the following steps: (1) soaking a battery cell in acid: crushing a battery cell of a retired lithium iron phosphate battery, soaking the battery cell in acid, and performing filtering; (2) performing electrolysis to reclaim copper: adding a copper cathode and a carbon anode into filtered solution, and performing electrolysis; (3) oxidizing ferrous iron: adding oxidant into the electrolyzed solution, and performing oxidation reaction; (4) precipitating iron phosphate: gradually adjusting pH of the solution resulting from the oxidation reaction to greater than 14 to obtain an iron phosphate precipitate and post-reaction solution; and (5) precipitating lithium carbonate: keeping adding carbonate solution into the post-reaction solution until a white precipitate no longer increases, and performing filtering to obtain a precipitate mixture of iron phosphate and lithium carbonate, which is a lithium iron phosphate precursor.

Compared with the existing technology, some embodiments of this application at least include the following beneficial effects:

(1) Low impurity content in an obtained lithium iron phosphate precursor. During reclamation of retired lithium iron phosphate batteries, copper ions and aluminum ions that are impurities are inevitably introduced by copper foil and aluminum foil. In the existing technology, some physical or chemical methods are provided to remove copper and aluminum. The physical methods to remove copper and aluminum include screening, flotation, wind separation, eddy-current separation, and the like, which require many equipments and high maintenance costs and are affected by the degree of crush. In addition, the physical methods mostly involve multi-stage filtering and many operation steps, where many copper and aluminum impurities still remain. The chemical methods to remove copper and aluminum in the existing technology are generally chemical precipitation, in which the element copper is transformed into a copper(II) sulfide or copper hydroxide precipitate and aluminum ions are transformed into an aluminum hydroxide precipitate. In these methods, other raw materials such as sodium sulfide and sodium hydroxide are used, which increases material costs and possibly introduces impurities. In addition, filtering and cleaning operations are further required after precipitation, which also increases processes. Produced copper (II) sulfide, copper hydroxide, and aluminum hydroxide cannot be used directly and require further smelting, complicating processes and consuming more materials.

In some embodiments of this application, dissolved copper ions are removed through electrolysis, and collected copper is single-substance copper and can be directly used in industrial applications after refining. Thus, the method according to this application requires simple equipments and easy operations. During the reclamation of retired lithium iron phosphate batteries, all dissolved aluminum ions are transformed into metaaluminate ions, to separate from the lithium iron phosphate precursor. Experiments have proved that impurity content of the lithium iron phosphate precursor obtained in some embodiments of this application is low, which is good for a lithium iron phosphate material made from the precursor to be reused.

(2) Lithium iron phosphate precursor obtained in one step. In some embodiments of this application, after the last step of precipitating lithium carbonate is complete, the lithium iron phosphate precursor, a mixture of iron phosphate and lithium carbonate, can be obtained through one-step reclamation. Compared with a two-step method of precipitating and reclamation, the method according to this application has advantages of fewer operation steps and shorter processes. More importantly, the last step of precipitating lithium carbonate is performed in suspension containing the iron phosphate precipitate. The lithium carbonate can precipitate on a surface of the iron phosphate and is easier to form crystal nucleus, improving the speed of precipitation. In addition, the reclaimed iron phosphate and lithium carbonate are naturally evenly mixed at uniform percentages, simplifying subsequent production steps in which they are synthesized to lithium iron phosphate.

A lithium iron phosphate material prepared from the precursor obtained in some embodiments of this application has a high capacity per gram, and when used in various lithium battery systems as a positive electrode active substance, the lithium iron phosphate material thus prepared allows the battery systems to have good cycle performance and a high capacity retention rate.

(3) Simple apparatus and easy operations. Except the operation of filtering to remove insolubles, the whole procedure of the method for producing a lithium iron phosphate precursor by using a retired lithium iron phosphate battery as a raw material provided in this application, can be completed within one reaction apparatus, with few operation steps and no additional mechanical operations. In this way, reclamation costs are low and damages to the environment and operation personnel are minimized.

DETAILED DESCRIPTION

The following describes in detail a method for producing a lithium iron phosphate precursor by using a retired lithium iron phosphate battery as a raw material according to this application.

The method for producing a lithium iron phosphate precursor by using a retired lithium iron phosphate battery as a raw material provided in the embodiments of this application includes the following steps: (1) soaking a battery cell in acid: crushing a battery cell of a retired lithium iron phosphate battery, soaking the battery cell in acid, and performing filtering; (2) performing electrolysis to reclaim copper: adding a copper cathode and a carbon anode into filtered solution, and performing electrolysis; (3) oxidizing ferrous iron: adding oxidant into the electrolyzed solution, and performing oxidation reaction; (4) precipitating iron phosphate: gradually adjusting pH of the solution resulting from the oxidation reaction to greater than 14 to obtain an iron phosphate precipitate and post-reaction solution; and (5) precipitating lithium carbonate: keeping adding carbonate solution into the post-reaction solution until a white precipitate no longer increases, and performing filtering to obtain a precipitate mixture of iron phosphate and lithium carbonate, which is a lithium iron phosphate precursor.

Reactions and operation principles of the steps in the foregoing procedure are as follows:

(1) In the step of soaking a battery cell in acid, lithium iron phosphate, an aluminum foil, and a small part of copper foil are dissolved by acid, but a separator, most of the copper foil, graphite, and a binder and a conductive agent of a positive electrode do not dissolve. These insolubles can be removed through filtering. The filtered solution contains hydrogen ions, lithium ions, ferrous ions, aluminum ions, chloride ions, phosphate ions, and a small amount of copper ions.

(2) In the step of performing electrolysis to reclaim copper, the following electrolysis reactions take place: $Cu^{2+}+2e^-\rightarrow Cu$, $2Cl^-\rightarrow 2e^-+Cl_2$, and $Cl_2+H_2O\rightarrow HCl+HClO$. When the electrolysis ends, the solution contains hydrogen ions, lithium ions, ferrous ions, ferric ions, aluminum ions, chloride ions, and phosphate ions.

(3) In the step of oxidizing ferrous iron, ferrous ions are oxidized into ferric ions through addition of the oxidant. After the oxidation reaction ends, the solution contains hydrogen ions, lithium ions, ferric ions, aluminum ions, chloride ions, and phosphate ions.

(4) In the step of precipitating iron phosphate, the pH value of the solution resulting from the oxidation reaction is gradually adjusted to greater than 14. In this process, when pH>1.5, iron phosphate starts to precipitate; when pH>2.5, the iron phosphate completely precipitates; when pH>5, aluminum hydroxide starts to precipitate; when pH>14, the aluminum hydroxide starts to dissolve; and when an excessive amount of sodium hydroxide solution is continuously added, the aluminum hydroxide completely dissolves into sodium metaaluminate. At this point, the precipitate is iron phosphate, and the solution contains lithium ions, metaaluminate ions, chloride ions, hydroxide ions, and sodium ions.

(5) In the step of precipitating lithium carbonate, as the carbonate solution is added, carbonate ions react with lithium ions to generate a lithium carbonate precipitate. When the white precipitate no longer increases, the lithium ions completely precipitate. At this point, the solution contains sodium hydroxide, sodium carbonate, sodium chloride, and sodium metaaluminate, while the precipitate contains iron phosphate and lithium carbonate. The precipitate mixture is a lithium iron phosphate precursor, which can be used for renewal of a lithium iron phosphate material after simple filtering and cleaning steps.

In an example, before the step of soaking a battery cell in acid, the method may further include: soaking the retired lithium iron phosphate battery in water for discharging and then dismantling the retired lithium iron phosphate battery to obtain the battery cell. Because retired batteries differ in their states of charge, for example, direct dismantling gives rise to safety risks such as fire caused by short circuits, therefore, performing a discharging step before dismantling a battery may significantly improve production safety. In an example, a discharging manner used is to soak the retired battery in water for discharging. Before the retired battery is soaked in water, an explosion-proof valve must be punctured or an opening must be made at another position in a battery housing, so that water can enter the battery and contact a negative electrode. Compared with other discharging methods such as discharging by a discharging equipment, discharging by soaking a battery in salt water, and discharging by making an opening in the battery and soaking it in salt water, in this example, the discharging manner of soaking the battery in water for discharging has advantages of lower costs and ensuring that no impurity is introduced into the battery cell.

In an example, in the step of soaking a battery cell in acid, the acid used to soak and dissolve the battery cell is inorganic strong acid or a mixture containing such acid. The inorganic strong acid may be selected from hydrochloric acid, sulfuric acid, or nitric acid, and is hydrochloric acid in an example. Comparative tests show that the hydrochloric acid can better dissolve the battery cell than the sulfuric acid or nitric acid, and has a higher dissolving efficiency.

In an example, in the step of performing electrolysis to reclaim copper, an electrolysis manner used may be constant current electrolysis or constant voltage electrolysis. A voltage between the copper cathode and the carbon anode is higher than 1.8V, and is 1.9V to 2.5V in an example. In the foregoing electrolysis process, the speed of electrolysis reaction can be increased by increasing a reaction voltage between the copper cathode and the carbon anode.

In an example, in the step of oxidizing ferrous iron, the oxidant used may be various common oxidants. For example, the oxidant may be selected from hydrogen peroxide or nitric acid. In an example, the oxidant is hydrogen peroxide. Oxidizing ferrous iron by using hydrogen peroxide as the oxidant has advantages of producing no byproducts or pollution, which further ensuring low impurity content of the renewed lithium iron phosphate precursor.

In an example, in the step of precipitating iron phosphate, the method of gradually adjusting pH of the solution may be adding alkali, that is, adding alkali into the solution resulting from the oxidation reaction. The alkali is strong alkali or a mixture containing such alkali. The strong alkali may be selected from sodium hydroxide, potassium hydroxide, or barium hydroxide, and is sodium hydroxide in an example. The sodium hydroxide has features of low cost and high solubility. In the process of adding alkali into the solution resulting from the oxidation reaction to gradually adjust pH, when pH>1.5, iron phosphate starts to precipitate; when pH>2.5, the iron phosphate completely precipitates; when pH>5, aluminum hydroxide starts to precipitate; when pH>14, the aluminum hydroxide starts to dissolve; and when an excessive amount of sodium hydroxide solution is continuously added, the aluminum hydroxide completely dissolves into sodium metaaluminate. At this point, the precipitate is iron phosphate, and the solution contains lithium ions, metaaluminate ions, chloride ions, hydroxide ions, and sodium ions.

In an example, in the step of precipitating iron phosphate, the method of gradually adjusting pH of the solution may alternatively be an electrolysis method, that is, adding a carbon cathode and a carbon anode into the solution resulting from the oxidation reaction and performing electrolysis. The following reaction takes place at the cathode: $2H^{+}+2e^{-} \rightarrow H_2\uparrow$, consuming hydrogen ions in the solution. When pH>1.5, iron phosphate starts to precipitate; when pH>2.5, the iron phosphate completely precipitates; when pH>5, aluminum hydroxide starts to precipitate; when pH>14, the aluminum hydroxide starts to dissolve; and when an excessive amount of sodium hydroxide solution is continuously added, the aluminum hydroxide completely dissolves into sodium metaaluminate. At this point, the precipitate is iron phosphate, and the solution contains lithium ions, metaaluminate ions, chloride ions, hydroxide ions, and sodium ions. The electrolysis method achieves the same effect of adjusting pH as the method of adding alkali. In addition, the electrolysis method requires no addition of reagents and has advantages of reducing material consumption and introducing no impurity.

In an example, in the step of precipitating lithium carbonate, the carbonate may be various soluble carbonates. For example, the carbonate may be selected from sodium carbonate or potassium carbonate, and is sodium carbonate in an example. The sodium carbonate has features of lower cost and high solubility.

The lithium iron phosphate precursor renewed in this embodiment of this application can be used to prepare a lithium iron phosphate material by using a conventional method in the art. Further, the lithium iron phosphate material prepared from the precursor can be applied in various lithium battery systems as a positive electrode active material.

A lithium-ion secondary battery is used as an example. The lithium-ion secondary battery typically includes a positive electrode plate, a negative electrode plate, a separator provided between the positive electrode plate and the negative positive electrode plate, and an electrolyte.

The positive electrode plate includes a positive electrode current collector and a positive electrode active substance layer provided on at least one surface of the positive electrode current collector. A positive electrode active material contained in the positive electrode active substance layer may be the lithium iron phosphate material prepared from the precursor obtained in this embodiment of this application. In addition, the positive electrode active substance layer may further include a conductive agent and a binder. Types and content amounts of the conductive agent and the binder are not specifically limited and can be selected based on actual requirements. A person skilled in the art can choose an appropriate method to prepare the positive electrode plate. For example, the method may include the following steps: mixing the lithium iron phosphate material, the binder, and the conductive agent to form a slurry and applying the slurry on the positive electrode current collector.

A type of the positive electrode current collector is also not specifically limited and can be selected based on an actual requirement. Typically, the positive electrode current collector may be a layer. The positive electrode current collector is generally a structure or a part that can collect current. The positive electrode current collector may be various materials in the art that can be used as a positive electrode current collector for a lithium-ion battery. For example, the positive electrode current collector may include but is not limited to a metal foil, and more specifically, may include but is not limited to a nickel foil and an aluminum foil.

The negative electrode plate typically includes a negative electrode current collector and a negative electrode active material layer provided on a surface of the negative electrode current collector. The negative electrode active material layer typically includes a negative electrode active material. The negative electrode active material may be various materials in the art that can be used as a negative electrode active material for a lithium-ion battery. For example, the negative electrode active material may include but is not limited to a combination of one or more of graphite, soft carbon, hard carbon, carbon fiber, mesophase carbon microbeads, silicon materials, tin-based materials, lithium titanate, or other metal that can form an alloy with lithium. The negative electrode current collector is generally a structure or a part that can collect current. The negative electrode current collector may be various materials in the art that can be used as a negative electrode current collector for a lithium-ion battery. For example, the negative electrode current collector may include but is not limited to a metal foil, and more specifically, may include but is not limited to a copper foil. In addition, the negative electrode plate may alternatively be a lithium plate.

The separator may be various materials in the art that can be used as a separator for a lithium-ion battery. For example, the separator may include but is not limited to a combination of one or more of polyethylene, polypropylene, polyvinylidene fluoride, aramid fiber, polyethylene terephthalate, polytetrafluoroethylene, polyacrylonitrile, polyimide, polyamide, polyester, and natural fiber.

The following further describes this application with reference to specific Examples and Comparative Examples. It should be understood that these specific examples are merely intended to describe this application but not to limit the scope of this application.

Renewal of a lithium iron phosphate precursor is described in Examples 1-4.

In Examples 1 to 4, the following method was used to produce a lithium iron phosphate precursor by using a retired lithium iron phosphate battery as a raw material.

(1) Reclaiming and discharging a retired battery: One retired lithium iron phosphate battery whose 100 Ah capacity faded to 80% was soaked in water for discharging and then dismantled to obtain a battery cell.

(2) Soaking the battery cell in acid: The battery cell was crushed and soaked in acid for dissolution. During soaking and dissolution, the acid kept being blended or temperature was increased to improve the speed of reaction. During soaking, lithium iron phosphate, an aluminum foil, and a small part of copper foil were dissolved. A separator, most of the copper foil, graphite, and a binder and a conductive agent of a positive electrode did not dissolve. During soaking and dissolution of the battery cell in acid, a large amount of hydrogen was generated from reaction between aluminum and hydrochloric acid. Attention should be paid to air pressure in the reaction apparatus, while ventilation should be kept and flame be avoided. Then, the insolubles were removed through filtering. The filtered solution contained hydrogen ions, lithium ions, ferrous ions, aluminum ions, chloride ions, phosphate ions, and a small amount of copper ions.

(3) Performing electrolysis to reclaim copper: A copper cathode and a carbon anode were added into the filtered solution, and electrolysis was performed to reclaim copper. The following electrolysis reactions took place: $Cu^{2+}+2e^- \rightarrow Cu$, $2Cl^- \rightarrow 2e^- + Cl_2$, and $Cl_2 + H_2O \rightarrow HCl + HClO$. In the electrolysis process, when a current is lower than 1 mA, electrolysis was stopped and an electrolysis apparatus was removed. The electrolysis reaction may generate chloride. Attention should be paid to air pressure in the reaction apparatus and ventilation should be kept. During the electrolysis process, blending can be performed to increase speed of the electrolysis reaction. When the electrolysis ended, the solution contained hydrogen ions, lithium ions, ferrous ions, ferric ions, aluminum ions, chloride ions, and phosphate ions.

(4) Oxidizing ferrous iron: Oxidant was added into the electrolyzed solution to allow oxidation reaction. The ferrous iron in the solution was oxidized into ferric iron and excessive oxidant was needed. During the oxidization process, blending could be performed to increase speed of the oxidation reaction. After the reaction ended, the solution contained hydrogen ions, lithium ions, ferric ions, aluminum ions, chloride ions, and phosphate ions.

(5) Precipitating iron phosphate: Strong alkali solution was added into the solution resulting from the oxidation reaction to gradually adjust pH. At the first stage, when pH>1.5, iron phosphate started to precipitate, and when pH>2.5, the iron phosphate completely precipitated. At the second stage, when pH>5, aluminum hydroxide started to precipitate. At the third stage, when pH>14, the aluminum hydroxide started to dissolve. When an excessive amount of sodium hydroxide solution was continuously added, the aluminum hydroxide completely dissolved into sodium metaaluminate. At this point, the precipitate contained iron phosphate, and the solution contained lithium ions, metaaluminate ions, chloride ions, hydroxide ions, and sodium ions.

(6) Precipitating lithium carbonate: Carbonate solution was continuously added into the post-reaction solution. Carbonate ions reacted with lithium ions to generate a lithium carbonate precipitate. The carbonate solution was continuously added until the white precipitate no longer increased. At this point, the precipitate contained iron phosphate and lithium carbonate, and the solution contained sodium hydroxide, sodium carbonate, sodium chloride, and sodium metaaluminate. The precipitate was filtered out and cleaned to obtain the lithium iron phosphate precursor.

For Examples 5 to 8, steps (1) to (4) and (6) in Examples 5 to 8 were the same as those in Examples 1 to 4, except Step (5). In Step (5) in Examples 5 to 8, which is the step of precipitating iron phosphate, the method of adding alkali into the solution resulting from the oxidation reaction to adjust pH was not used. Instead, an electrolysis method was used to adjust pH. Specifically, a carbon cathode and a carbon anode were added into the solution resulting from the oxidation reaction and electrolysis was performed. The following reaction took place at the cathode: $2H^+ + 2e^- \rightarrow H_2\uparrow$. Consequently, concentration of hydrogen ions in the electrolyte gradually decreased and alkalinity gradually increased.

Specific reagents and parameters in Examples 1 to 8 were shown in Table 1.

TABLE 1

Specific reagents and parameters in Examples 1 to 8

| | Soaking battery cell in acid | | | Electrolysis to reclaim copper | | Oxidizing ferrous iron | | Precipitating iron phosphate | | | | | | Precipitating lithium carbonate | |
|---|---|---|---|---|---|---|---|---|---|---|---|---|---|---|---|
| | | | | | Voltage/ | | | pH adjustment | | | | | Voltage/ | | |
| | Acid | CA* | EM* | | Current | Oxidant | OC* | method | Alkali | CB* | EM* | | Current | Carbonate | CC* |
| Example 1 | HCl | 20% | a* | | $2.0 V \rightarrow 20 A/m^2$ | $H_2O_2$ | 30% | b* | NaOH | 100 g/L | / | | / | $Na_2CO_3$ | 20% |
| Example 2 | $H_2SO_4$ | 50% | a* | | $200 A \rightarrow 20 A/m^2$ | $H_2O_2$ | 30% | b* | NaOH | 100 g/L | / | | / | $Na_2CO_3$ | 20% |
| Example 3 | HCl | 20% | a* | | $2.0 V \rightarrow 20 A/m^2$ | $HNO_3$ | 30% | b* | KOH | 100 g/L | / | | / | $Na_2CO_3$ | 20% |
| Example 4 | $H_2SO_4$ | 50% | a* | | $200 A \rightarrow 20 A/m^2$ | $HNO_3$ | 30% | b* | KOH | 100 g/L | / | | / | $Na_2CO_3$ | 20% |
| Example 5 | HCl | 20% | a* | | $2.0 V \rightarrow 20 A/m^2$ | $H_2O_2$ | 30% | c* | / | / | a* | | $2.0 V \rightarrow 20 A/m^2$ | $Na_2CO_3$ | 20% |
| Example 6 | $H_2SO_4$ | 50% | a* | | $200 A \rightarrow 20 A/m^2$ | $H_2O_2$ | 30% | c* | / | / | a* | | $200 A \rightarrow 20 A/m^2$ | $Na_2CO_3$ | 20% |
| Example 7 | HCl | 20% | a* | | $2.0 V \rightarrow 20 A/m^2$ | $HNO_3$ | 30% | c* | / | / | a* | | $2.0 V \rightarrow 20 A/m^2$ | $Na_2CO_3$ | 20% |
| Example 8 | $HNO_3$ | 50% | a* | | $200 A \rightarrow 20 A/m^2$ | $HNO_3$ | 30% | c* | / | / | a* | | $200 A \rightarrow 20 A/m^2$ | $Na_2CO_3$ | 20% |

Notes:
CA*: Concentration of acid solution,
EM*: Electrolysis method,
OC*: Oxidant concentration.
CB*: Concentration of alkali solution,
CC*: Carbonate concentration.
a*: Constant voltage electrolysis,
b*: Adding alkali,
c*: Electrolysis.

Comparative Example 1

(1) Crushing a battery: One retired lithium iron phosphate battery whose 100 Ah capacity faded to 80% was dismantled. After discharging, the battery was completely crushed.

(2) Soaking in water: After an aluminum top cover was reclaimed, the crushed battery was put into a 10 L reaction kettle and 5 L water was added to soak the crushed battery. Blending was performed. A positive electrode material was separated from an aluminum foil and a negative electrode material was separated from a copper foil. A separator was taken out.

(3) Filtering: A screen mesh with a screen mesh number of 20 was used. Most lithium iron phosphate and graphite passed the mesh and remained in filtered solution. A filter residue that remained on the mesh was mainly copper and aluminum. A screen mesh with a screen mesh number of 80 was used. The lithium iron phosphate that remained on the mesh included most lithium iron phosphate and a small amount of copper and aluminum scraps and graphite. A small amount of lithium iron phosphate and graphite passed the mesh and remained in the filtered solution.

(4) Eddy-current separation: The lithium iron phosphate and a small amount of copper and aluminum scraps and graphite that remained on the mesh with a screen mesh number of 80 were dried, grinded by a ball mill, and then screened by eddy current to remove the copper and aluminum scraps.

(5) Synthesizing lithium iron phosphate: The materials resulting from the eddy-current separation were dissolved in hydrochloric acid and graphite was removed through filtering. Lithium salt was added to adjust percentages of phosphorus, lithium, and iron. Citric acid was added. The solution was dried, crushed, and grinded, and then baked in mixed hydrogen and argon at 600° C. for 5 h to obtain a carbon-coated lithium iron phosphate material.

Comparative Example 2

(1) Crushing a battery: One retired lithium iron phosphate battery whose 100 Ah capacity faded to 80% was dismantled. After discharging, the battery was completely crushed.

(2) Soaking a battery cell in acid: After an aluminum top cover was reclaimed, the crushed battery was put into a 10 L reaction kettle and 3 L hydrochloric acid with a concentration of 20% was added. Blending and soaking was performed for 2 h at 25° C. Residue was removed through filtering.

(3) Oxidizing ferrous iron: 300 mL hydrogen peroxide solution with a concentration of 30% was added into the solution to oxidize ferrous iron into ferric iron.

(4) Precipitating iron phosphate: 5 mol/L aqueous ammonia was added into the solution to adjust pH of the solution to approximately 2.0 and precipitated $FePO_4$ was collected.

(5) Precipitating aluminum hydroxide and copper hydroxide: 5 mol/L aqueous ammonia was added into the post-reaction solution to adjust pH of the solution to approximately 6.4 and precipitated aluminum hydroxide and copper hydroxide were removed through filtering.

(6) Precipitating lithium carbonate: Sodium carbonate solution was continuously added into the post-reaction solution until a white precipitate no longer increases, and filtering was performed to obtain a precipitate of a mixture of lithium carbonate.

(7) Synthesizing lithium iron phosphate: The iron phosphate collected in Step (4), the lithium carbonate collected in Step (6), and sucrose were evenly mixed and baked in mixed hydrogen and argon at 600° C. for 5 h to obtain a carbon-coated lithium iron phosphate material.

Test of ICP Impurity Content in a Precursor:

Before a test of ICP impurity content was performed, the following method was used to process the lithium iron phosphate precursors obtained in Examples 1 to 8 and Comparative Examples 1 and 2:

a) 0.2 g of the sample was weighed and put in a digestion vessel, 12 mL Lefort aqua regia (9 mL HNO3+3 mLHCl) was added into the digestion vessel, and the digestion vessel was placed in a microwave digestion system for digestion (180° C.).

b) After the digestion ended, the solution was filtered by using filter paper and a funnel and its volume was fixed at 100 mL.

Results of the ICP impurity content testing are shown in Table 2.

TABLE 2

Results of ICP impurity content testing
Impurity content of lithium iron phosphate precursor

| | Copper | Aluminum | Sodium | Potassium |
|---|---|---|---|---|
| Example 1 | 0.068% | 0.034% | 0.020% | 0.012% |
| Example 2 | 0.059% | 0.037% | 0.019% | 0.011% |
| Example 3 | 0.071% | 0.035% | 0.023% | 0.011% |
| Example 4 | 0.066% | 0.032% | 0.027% | 0.014% |
| Example 5 | 0.068% | 0.034% | 0.015% | 0.012% |
| Example 6 | 0.059% | 0.037% | 0.016% | 0.011% |
| Example 7 | 0.071% | 0.035% | 0.014% | 0.011% |
| Example 8 | 0.059% | 0.032% | 0.017% | 0.014% |
| Comparative Example 1 | 0.620% | 0.255% | 0.012% | 0.015% |
| Comparative Example 2 | 0.079% | 0.033% | 0.017% | 0.014% |

It can be learned from Table 2 that impurity content of the lithium iron phosphate precursors obtained in Examples 1 to 8 was obviously decreased as compared with that in Comparative Examples 1 and 2.

A lithium iron phosphate material was renewed and applied in a lithium-ion secondary battery:

The lithium iron phosphate precursors obtained in Examples 1 to 8 and Comparative Examples 1 and 2 were synthesized into lithium iron phosphate by using a conventional method in the art. Then, the synthesized lithium iron phosphate materials were used as positive electrode active substances to prepare lithium-ion secondary batteries. In an example, the conventional method may specifically be: performing ICP testing to test content percentages of lithium, iron, and phosphorus elements, with ferrous oxalate used to adjust a percentage of the iron element, diammonium hydrogen phosphate used to adjust a percentage of the phosphorus element, and lithium carbonate used to adjust a percentage of the lithium element, and adding sucrose to obtain a precursor with a Li/Fe/P/C molar ratio of 1.12:1:1:1:0.05; then evenly mixing the precursor by using a ball mill and baking it in mixed hydrogen and argon at 600° C., a temperature increased to at 5° C./min, for 3 h to obtain a lithium iron phosphate material.

(1) Prepare a positive electrode plate: A positive electrode active substance lithium iron phosphate, a conductive agent conductive carbon black (Super P), and a binder polyvinylidene fluoride (PVDF) were mixed at a mass ratio of 97:1.5:1.5, the resulting mixture was added into a solvent N-methylpyrrolidone (NMP), and blended by using a vacuum mixer until it was uniform and transparent, to obtain a positive electrode active substance slurry. The positive electrode active substance (the lithium iron phosphate synthesized from the precursor) slurry was evenly applied on an aluminum foil of a positive electrode current collector and dried, followed by cold pressing, trimming, cutting into pieces, and striping to obtain a positive electrode plate.

(2) Prepare a negative electrode plate: A negative electrode active material, a conductive agent conductive carbon black (Super P), a thickener sodium carboxy methyl cellulose (CMC), and a binder styrene-butadiene rubber emulsion (SBR) were mixed at a mass ratio of 96.4:1.5:0.5:1.6, the resulting mixture was added into deionized water and blended by using a vacuum mixer to obtain a uniform negative electrode active substance slurry. The negative electrode active substance slurry was evenly applied on a copper foil of a negative electrode current collector and dried, followed by cold pressing, trimming, cutting into pieces, and striping to obtain a negative electrode plate.

(3) Prepare a separator: A polyethylene film (PE) was used as a separator.

(4) Prepare an electrolyte: Ethylene carbonate (EC), ethyl methyl carbonate (EMC), and diethyl carbonate (DEC) were mixed at a mass ratio of 27/3/30/40 and evenly mixed with dissolved 1.1 mol/L $LiPF_6$ lithium salt to obtain an electrolyte.

(5) Prepare a lithium-ion battery: The positive electrode plate, separator, and negative electrode plate were sequentially laminated so that the separator was sandwiched between the positive electrode plate and the negative electrode plate, then they were winded into a battery cell and packed into a package housing which was sealed after the prepared liquid electrolyte was injected. Then, processes such as standing, hot pressing, cold pressing, and chemical conversion were performed to obtain a lithium-ion battery.

Performance Test for the Lithium-Ion Battery:

(1) Testing Capacity Per Gram of LFP Material

The positive electrode plates prepared in Examples 1 to 8 and Comparative Examples 1 and 2 were assembled into button cells which were left to stand in a constant temperature of 25° C. for 2 h, then charged to 3.75V at 2.0V to 3.75V and 0.1C. Then, the cell was charged to a current of <0.05 mA at a constant voltage and left to stand for 5 minutes. Then, the cell was discharged to 2.0V at 0.1C. A capacity of the button cell was recorded. The tested capacity value was divided by a mass of the positive electrode active material in the cell to obtain a capacity of the positive electrode active material in the lithium-ion battery.

(2) Testing Capacity Retention Rate of the Lithium-Ion Secondary Battery at 2C Discharge:

At 25° C., the lithium-ion battery was charged to a voltage of 3.65V at a constant current of 0.5C, charged to a current of 0.05C at a constant voltage of 3.65V, and then discharged at a constant current of 0.5C to a final voltage of 2.5V. A 0.5C discharge capacity was recorded. Then, the lithium-ion battery was charged to a voltage of 3.65V at a constant current of 0.5C, charged to a current of 0.05C at a constant voltage of 3.65V, and then discharged at a constant current of 2C to a final voltage of 2.5V. A 2C discharge capacity was recorded. The 2C capacity retention rate was calculated based on the following formula: 2C capacity retention rate=2C discharge capacity/0.5C discharge capacity.

(3) Testing Capacity Retention Rate of the Lithium-Ion Secondary Battery after 500 Cycles of Charging and Discharging at 60° C.:

At 60° C., the lithium-ion battery was charged to a voltage of 3.65V at a constant current of 1C, charged to a current of 0.05C at a constant voltage of 3.65V, and then discharged at a constant current of 1C to a final voltage of 2.5V. A discharge capacity of the first cycle was recorded. Then, charging and discharging were repeated according to the foregoing operations until 500 cycles and a discharge capacity of the $500^{th}$ cycle was recorded. A capacity retention rate of the $500^{th}$ cycle was calculated based on the following formula: capacity retention rate of the $500^{th}$ cycle=discharge capacity of the $500^{th}$ cycle/discharge capacity of the first cycle.

Table 3 shows results of the battery performance test for the lithium-ion secondary batteries to which the lithium iron phosphates prepared from the precursors in Examples 1 to 8 and Comparative Examples 1 and 2 were applied as their positive electrode active substances.

TABLE 3

Results of battery performance test
Performance test

| | Capacity per gram of LFP material | Capacity retention rate of the battery at 2 C discharge | Capacity retention rate of the battery after 500 cycles of charging and discharging at 60° C. |
|---|---|---|---|
| Example 1 | 158 | 94.3% | 92.3% |
| Example 2 | 156 | 94.1% | 92.0% |
| Example 3 | 157 | 93.8% | 91.8% |
| Example 4 | 155 | 93.9% | 91.9% |
| Example 5 | 160 | 94.5% | 92.5% |
| Example 6 | 158 | 94.4% | 92.3% |
| Example 7 | 159 | 94.1% | 92.5% |
| Example 8 | 157 | 93.9% | 92.2% |
| Comparative Example 1 | 152 | 93.2% | 88.5% |
| Comparative Example 2 | 154 | 94.0% | 90.0% |

It can be learned from the test results for Examples 1 to 8 and Comparative Examples 1 and 2 that the capacity per gram of the LFP material, 2C discharge capacity retention rate of the battery, and capacity retention rate of the battery after 500 cycles of charging and discharging at 60° C. in Examples 1 to 8 were all better than those in Comparative Examples 1 and 2. This indicates that because the impurity content of the lithium iron phosphate precursor obtained in the embodiments of this application is low, and iron phosphate and lithium carbonate in the precursor are mixed at uniform percentages, the lithium iron phosphate material prepared from the precursor obtained in the embodiments of this application has a high capacity per gram, and when used in various lithium battery systems as a positive electrode active substance, allows the battery systems to have good cycle performance and a high capacity retention rate.

According to the disclosure and teaching of this specification, a person skilled in the art may make further changes or modifications to the foregoing implementations. Therefore, this application is not limited to the foregoing disclosure and the described specific implementations, and some changes or modifications to this application shall also fall within the protection scope of the claims of this application. In addition, although some specific terms are used in this application, these terms are used only for ease of description, and do not constitute any limitation on this application.

What is claimed is:

1. A method for producing a lithium iron phosphate precursor by using a retired lithium iron phosphate battery as a raw material, wherein the retired lithium iron phosphate battery comprises a positive electrode, the positive electrode comprises lithium iron phosphate, an aluminum foil, and copper foil, and the method comprises the steps of:
   (1) soaking a battery cell in acid, comprising: crushing a battery cell of a retired lithium iron phosphate battery, soaking the battery cell in acid, and performing filtering to obtain a filtered solution, wherein the filtered solution comprises copper ions;
   (2) performing electrolysis to reclaim copper from the filtered solution, comprising: adding a copper cathode and a carbon anode into the filtered solution, and performing electrolysis on the filtered solution to obtain an electrolyzed solution;

(3) oxidizing ferrous iron, comprising: adding an oxidant into the electrolyzed solution, and performing oxidation reaction to obtain a post-oxidization solution;

(4) precipitating iron phosphate, comprising: performing a process of gradually adjusting pH of the post-oxidization solution to greater than 14 to obtain an iron phosphate precipitate and a post-reaction solution; and (5) precipitating lithium carbonate, comprising: continuously adding a carbonate solution to the post-reaction solution to obtain a lithium carbonate precipitate, keeping adding the carbonate solution into the post-reaction solution until the lithium carbonate precipitate no longer increases, and performing filtering to obtain a precipitate mixture of the iron phosphate and the lithium carbonate, wherein the precipitate mixture is a lithium iron phosphate precursor.

2. The method according to claim 1, wherein before the step of soaking a battery cell in acid, further comprising: soaking the retired lithium iron phosphate battery in water for discharging and then dismantling the retired lithium iron phosphate battery to obtain the battery cell.

3. The method according to claim 1, wherein the acid in the step of soaking a battery cell in acid is inorganic strong acid or a mixture containing such acid; the inorganic strong acid is selected from hydrochloric acid, sulfuric acid, or nitric acid.

4. The method according to claim 3, wherein the inorganic strong acid is selected from hydrochloric acid.

5. The method according to claim 1, wherein performing electrolysis to reclaim copper is performing electrolysis at a constant current or performing electrolysis at a constant voltage, wherein a voltage between the copper cathode and the carbon anode is higher than 1.8V.

6. The method according to claim 5, wherein the voltage is in a range of 1.9V to 2.5V.

7. The method according to claim 1, wherein the oxidant is selected from hydrogen peroxide or nitric acid.

8. The method according to claim 1, wherein the oxidant is selected from hydrogen peroxide.

9. The method according to claim 1, wherein the step of precipitating iron phosphate comprises adding alkali into the post-oxidization solution, gradually adjusting pH to greater than 14, and continuing adding until the alkali is excessive, to obtain the iron phosphate precipitate and the post-reaction solution.

10. The method according to claim 9, wherein the alkali is a strong alkali or a mixture containing such alkali, wherein the strong alkali is selected from sodium hydroxide, potassium hydroxide, or barium hydroxide.

11. The method according to claim 10, wherein the strong alkali is selected from sodium hydroxide.

12. The method according to claim 1, wherein the step of precipitating iron phosphate comprises adding a carbon cathode and a carbon anode into the post-oxidization solution, performing electrolysis to consume hydrogen ions in the post-oxidization solution, gradually adjusting pH to greater than 14, and continuing the electrolysis to obtain the iron phosphate precipitate and the post-reaction solution.

13. The method according to claim 1, wherein in the process of gradually adjusting pH to greater than 14, when pH is greater than 1.5, iron phosphate starts to precipitate, wherein when pH reaches 2.5, the iron phosphate completely precipitates, wherein when pH is greater than 5, aluminum hydroxide starts to precipitate, wherein when pH is greater than 14, the aluminum hydroxide starts to dissolve, and wherein when alkalinity continues increasing, the aluminum hydroxide dissolves into sodium metaaluminate.

14. The method according to claim 1, wherein in the step of precipitating lithium carbonate, the carbonate solution comprises a soluble carbonate, selected from at least one of sodium carbonate or potassium carbonate.

15. The method according to claim 14, wherein the carbonate is sodium carbonate.

16. The method according to claim 1, wherein in the step of soaking the battery cell in acid, the filtered solution further comprises hydrogen ions, lithium ions, ferrous ions, aluminum ions, chloride ions, and phosphate ions.

17. The method according to claim 1, after performing electrolysis and before oxidizing ferrous iron, the electrolyzed solution comprises hydrogen ions, lithium ions, ferrous ions, ferric ions, aluminum ions, chloride ions, and phosphate ions.

18. The method according to claim 1, the post-oxidization solution comprises hydrogen ions, lithium ions, ferric ions, aluminum ions, chloride ions, and phosphate ions.

19. The method according to claim 1, after precipitating lithium carbonate, the post-reaction solution comprises lithium ions, metaaluminate ions, chloride ions, hydroxide ions, and sodium ions.

20. The method according to claim 1, wherein the retired lithium iron phosphate battery further comprises a separator, and the positive electrode further comprises graphite, a binder, and a conductive agent, the separator, the graphite, the binder, and the conductive agent are not dissolved.

* * * * *